(12) United States Patent
Lu

(10) Patent No.: US 10,488,091 B2
(45) Date of Patent: Nov. 26, 2019

(54) CONNECTION DEVICE FOR LEAK DETECTOR

(71) Applicant: Ken-Wang Lu, New Taipei (TW)

(72) Inventor: Ken-Wang Lu, New Taipei (TW)

(*) Notice: Subject to any disclaimer, the term of this patent is extended or adjusted under 35 U.S.C. 154(b) by 337 days.

(21) Appl. No.: 15/453,910

(22) Filed: Mar. 9, 2017

(65) Prior Publication Data

US 2017/0176073 A1 Jun. 22, 2017

(30) Foreign Application Priority Data

Aug. 1, 2016 (TW) .............................. 105211615 U

(51) Int. Cl.
| | |
|---|---|
| *G01M 3/02* | (2006.01) |
| *F25B 49/00* | (2006.01) |
| *G01M 3/32* | (2006.01) |
| *G01M 3/28* | (2006.01) |

(52) U.S. Cl.
CPC ......... *F25B 49/005* (2013.01); *G01M 3/2846* (2013.01); *G01M 3/3236* (2013.01); *F25B 2500/222* (2013.01)

(58) Field of Classification Search
CPC ............. F25B 49/005; F25B 2500/222; Y10T 403/7129; Y10T 403/7141; G01M 3/2846; G01M 3/3236
USPC ...................................................... 73/40.5 R
See application file for complete search history.

(56) References Cited

U.S. PATENT DOCUMENTS

| | | | | |
|---|---|---|---|---|
| 6,564,613 | B1* | 5/2003 | Speer | F25B 49/005 73/40.5 R |
| 6,779,350 | B2* | 8/2004 | Ramachandran | F04B 39/02 62/149 |
| 7,469,934 | B2* | 12/2008 | Inaba | F16L 39/00 285/124.3 |
| 7,841,229 | B2* | 11/2010 | Ridgway | G01M 3/3263 73/40.5 R |
| 7,971,910 | B2* | 7/2011 | Holt | F16L 39/00 285/13 |
| 8,251,135 | B2* | 8/2012 | Santanach | B60H 1/00485 165/178 |
| 9,114,687 | B2* | 8/2015 | Dorland | B60H 1/00571 |
| 2007/0051167 | A1* | 3/2007 | Finley | F16L 41/008 73/40.5 R |
| 2017/0146449 | A1* | 5/2017 | Coates | G01N 21/3504 |

* cited by examiner

*Primary Examiner* — Joshua T Kennedy

(57) ABSTRACT

A connection device for a leak detector for detecting leaks in pipes of an automobile air conditioning system is provided with an elongated body defining a plurality of fixing holes, a through hole, and a slot; a first threaded hollow fastener disposed through the through hole of the elongated body, the first threaded hollow fastener including a first externally threaded valve, a first connection member defining an opening, and a first O-ring placed on the first connection member; and a second threaded hollow fastener moveably disposed through the slot of the elongated body, the second threaded hollow fastener including a second externally threaded valve, a second connection member defining an opening, and a second O-ring placed on the second connection member.

1 Claim, 5 Drawing Sheets

CONNECTION DEVICE FOR LEAK DETECTOR

BACKGROUND OF THE INVENTION

1. Field of the Invention

The invention relates to leak detection and more particularly to a connection device for a leak detector for detecting leaks in pipes of an automobile air conditioning system.

2. Description of Related Art

A conventional leak detector for detecting gas leaks in a pressurized gas source comprises a housing containing a sampling chamber; an infrared emitter for emitting IR energy; a single filter for allowing IR energy to pass therethrough; a sensor for detecting IR energy that has passed through the single filter to detect the presence of selected gas constituents in a gas sample; and a pump for forcing a gas sample from a suspected gas leak that emanates from the pressurized gas source through the sampling chamber.

While the device enjoys its success in the market, continuing improvements in the exploitation of leak detector and its connection device are constantly being sought.

SUMMARY OF THE INVENTION

It is therefore one object of the invention to provide a connection device for a leak detector for detecting leaks in pipes of an automobile air conditioning system. The connection device comprises an elongated body defining a plurality of fixing holes, a through hole and a slot; a first threaded hollow fastener disposed through the through hole of the elongated body, the first threaded hollow fastener including a first end and a second end, the first end having a first externally threaded valve, the second end having a first connection member defining an opening to the hollow of the first fastener, and a first O-ring placed on the first connection member; and a second threaded hollow fastener moveably disposed through the slot of the elongated body, the second threaded hollow fastener including a first end and a second end, the first end having a second externally threaded valve, the second end having a second connection member defining an opening to the hollow of the second fastener, and a second O-ring placed on the second connection member.

The above and other objects, features and advantages of the invention will become apparent from the following detailed description taken with the accompanying drawings.

DETAILED DESCRIPTION OF THE INVENTION

Figure 1:
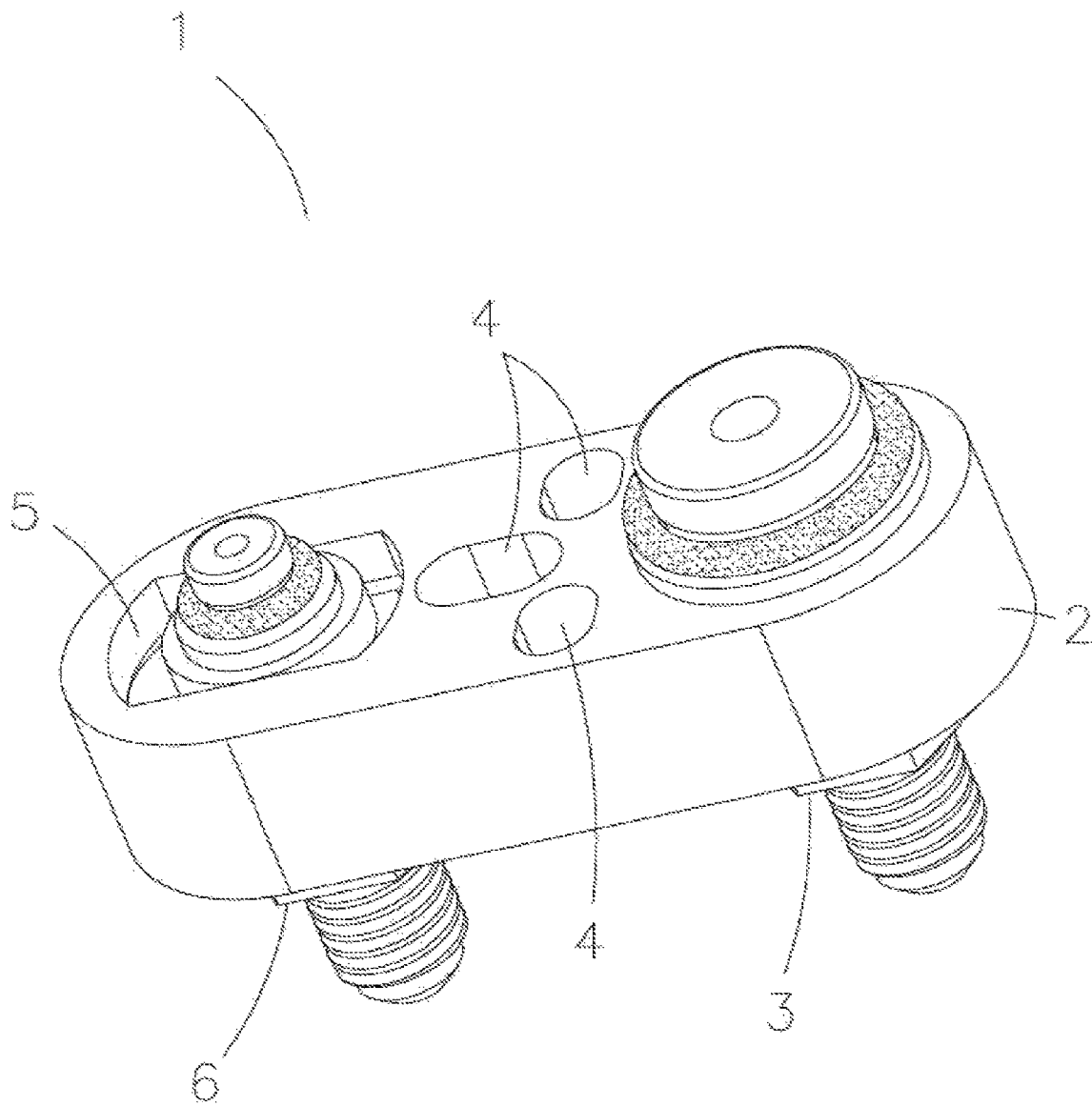
FIG. 1 is a perspective view of a connection device fora leak detector according to the invention.
Figure 2:
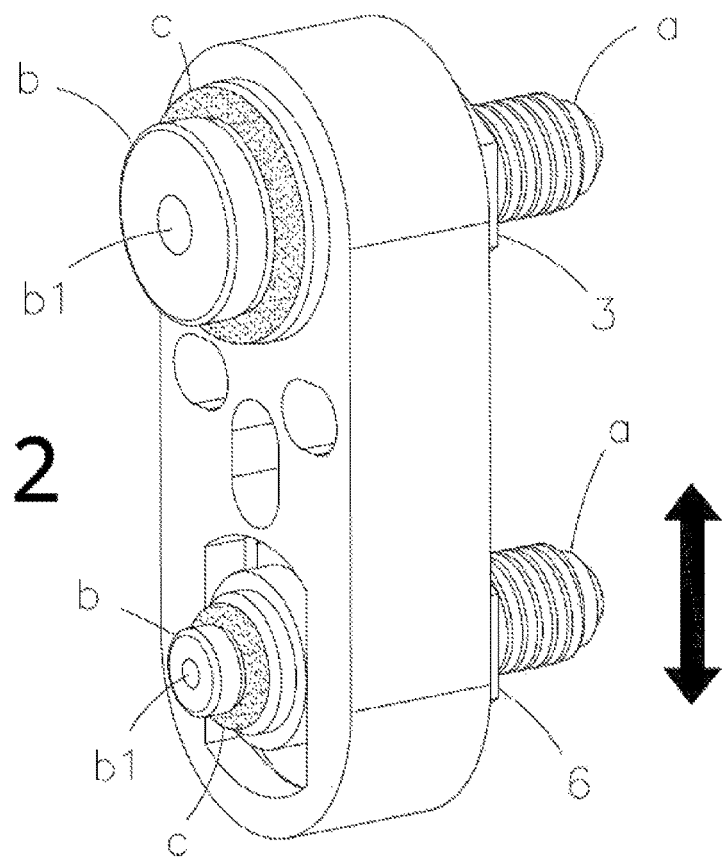
FIG. 2 is another perspective view of the connection device.
Figure 3:
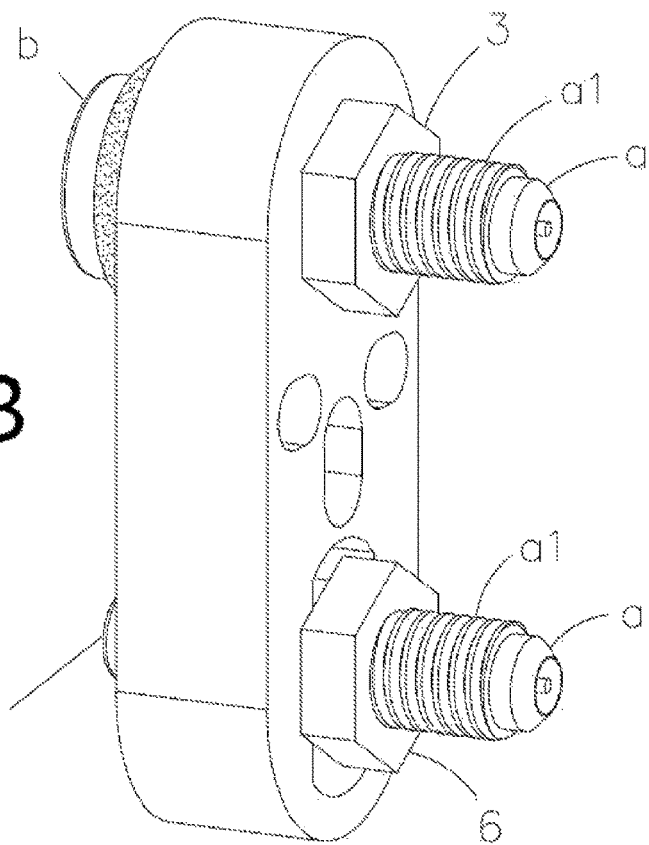
FIG. 3 is still another perspective view of the connection device.
Figure 4:
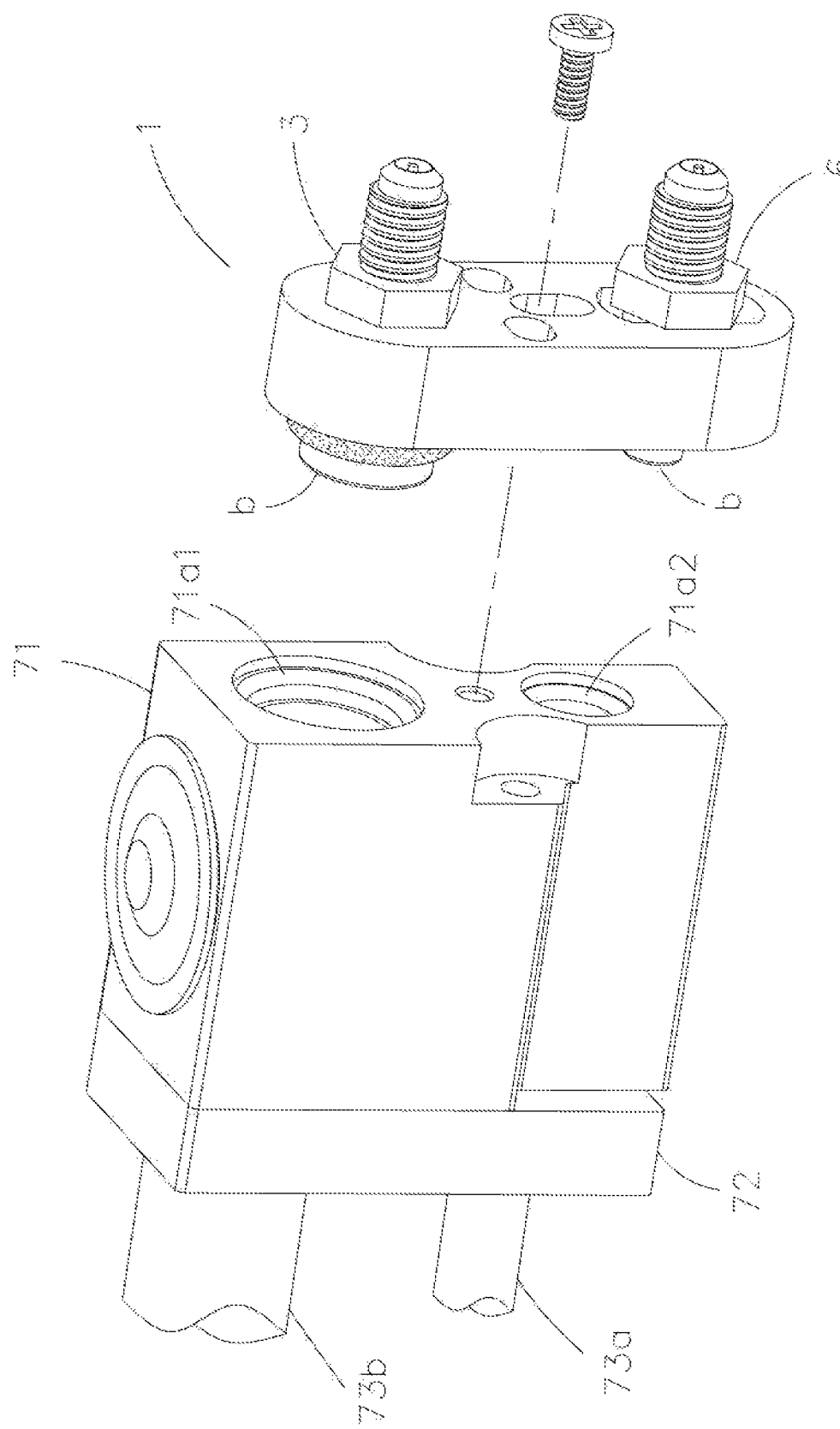
FIG. 4 is a perspective view showing an expansion valve to be secured to the connection device.
Figure 5:
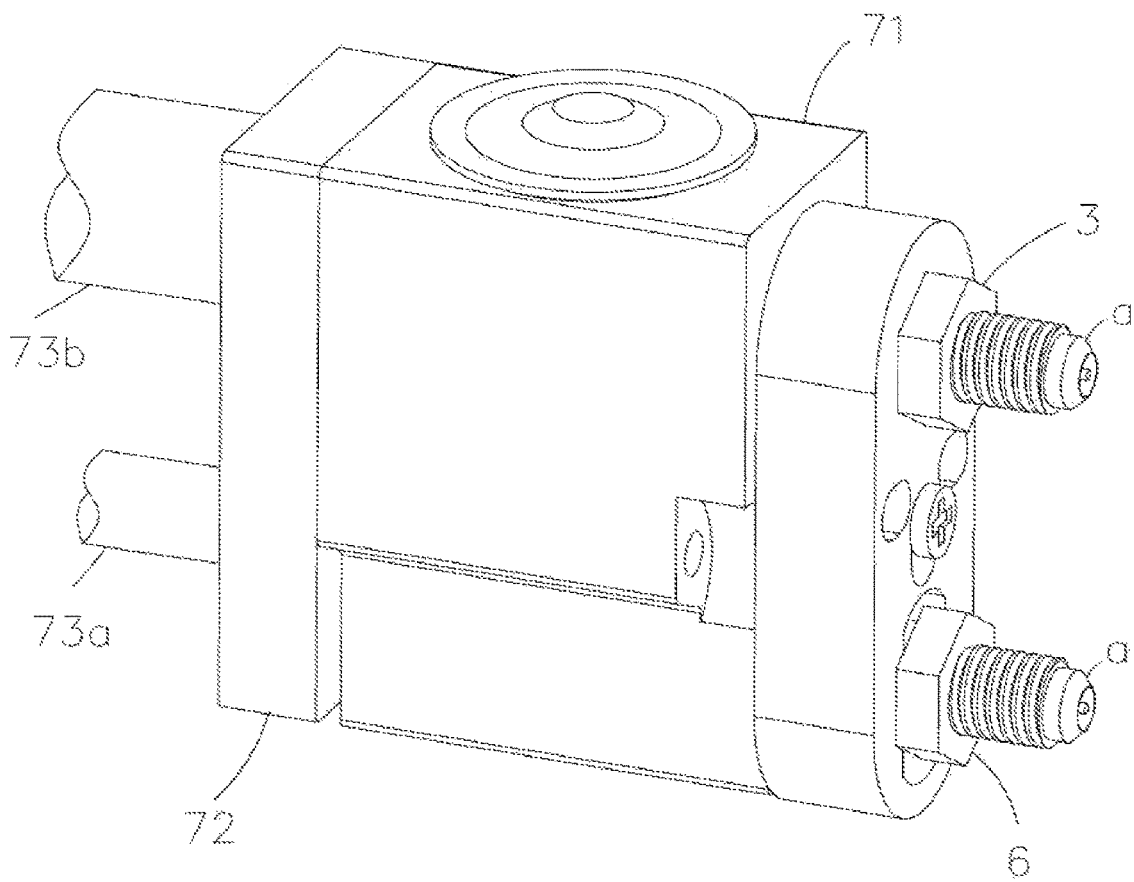
FIG. 5 is a perspective view of the assembled expansion valve and the connection device.
Figure 6:
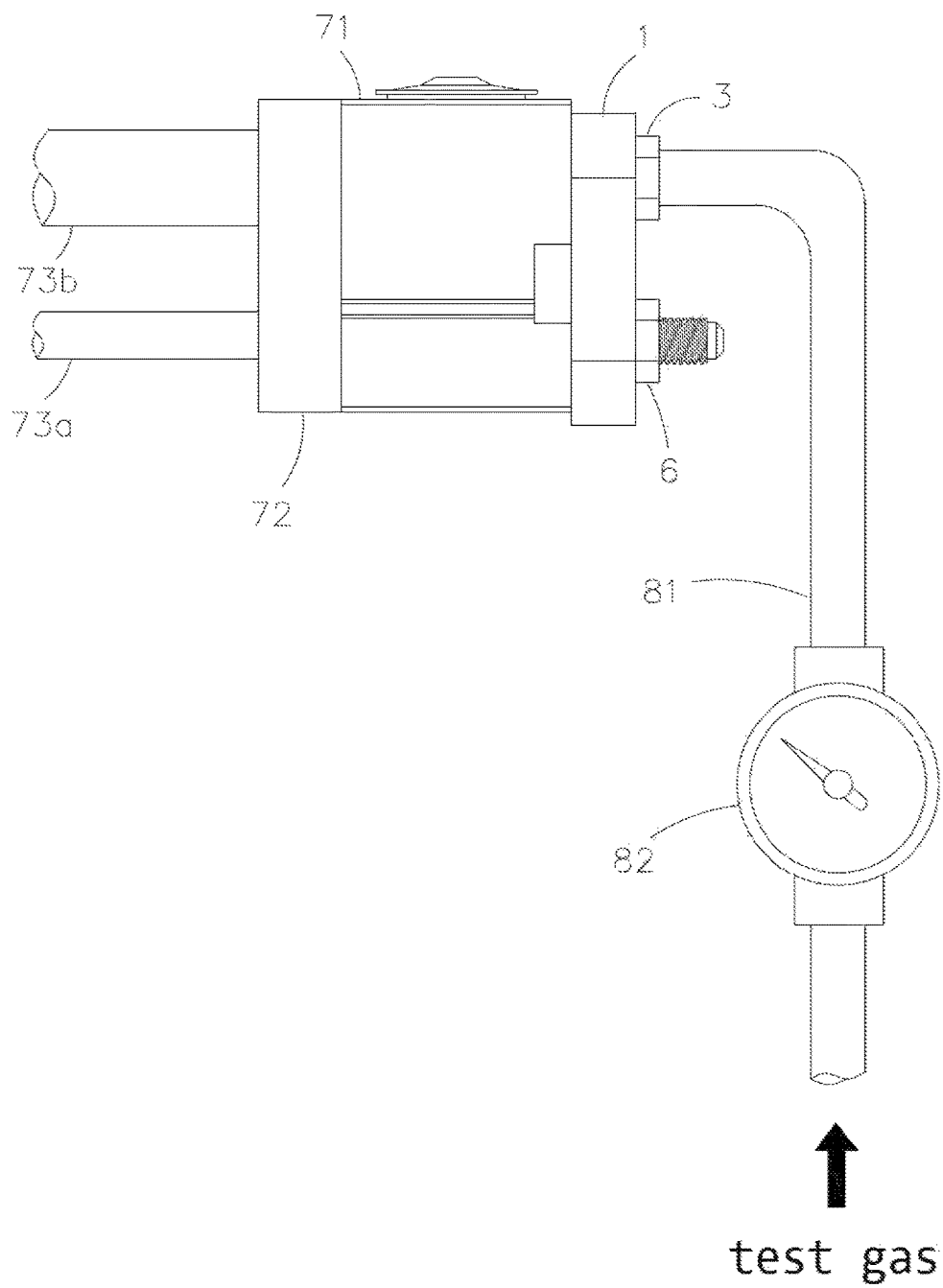
FIG. 6 is a side elevation schematically showing a test pipe connected to the connection device of FIG. 5 for detecting leaks in pipes of an automobile air conditioning system.

Referring to FIGS. 1 to 6, a connection device 1 for a leak detector for detecting leaks in pipes of an automobile air conditioning system in accordance with the invention comprises the following components as discussed in detail below.

An elongated body 2 defines three fixing holes 4 at an intermediate portion, a slot 5 at a first lateral portion, and a through hole (not labeled) at a second lateral portion. A first threaded hollow fastener 3 is provided through the through hole of the body 2. The first threaded hollow fastener 3 includes a first end and a second end. The first end has a valve (a) and a threaded portion (a1) formed at an outer surface of the valve (a), thus forming a first externally threaded valve. The second end has a connection member (b) defining an opening (b1) to the hollow of the first fastener 3, and an O-ring (c) placed on the connection member (b) of the first fastener 3. A second threaded hollow fastener 6 is provided through the slot 5 of the body 2. The second threaded hollow fastener 6 includes a first end and a second end. The first end has a valve (a) and a threaded portion (a1) formed at an outer surface of the valve (a). The second end has a connection member (b) defining an opening (b1) to the hollow of the second fastener 6, and an O-ring (c) placed on the connection member (b) of the second fastener 6, thus forming a second externally threaded valve.

An automobile air conditioning system includes a mounting plate 72 and an expansion valve 71 secured to the mounting plate 72. The expansion valve 71 includes a first channel 71a1 connected to an outlet pipe 73b and communicating therewith, and a second channel 71a2 connected to an inlet pipe 73a and communicating therewith. The inlet pipe 73a and the outlet pipe 73b communicate with each other.

For detecting leaks in pipes of an automobile air conditioning system, an employee may quickly connect the connection members (b) of the first and second fasteners 3, 6 to the first and second channels 71a1 and 71a2 respectively. Also, the connections are leakproof due to the provision of the O-rings (c). The valve (a) of the first threaded hollow fastener 3 communicates with the outlet pipe 73b, which is connected to the evaporator of the automobile air conditioning system, via the first channel 71a1 of the expansion valve 71. The valve (a) of the second threaded hollow fastener 6 communicates with the inlet pipe 73a, which is connected to the condenser of the automobile air conditioning system, via the second channel 71a2 of the expansion valve 71. Thereafter, a test pipe 81 is connected to the valve (a) of the first threaded hollow fastener 3. Alternatively, the test pipe 81 is connected to the valve (a) of the second threaded hollow fastener 6 in other embodiments. A pressure gauge 82 is mounted on the test pipe 81. Then test gas is supplied to the test pipe 81. The test gas passes through the valve (a) of the first threaded hollow fastener 3, the first channel 71a1 of the expansion valve 71, the outlet pipe 73b, various parts of the automobile air conditioning system, the inlet pipe 73a, and the second channel 71a2 of the expansion valve 71, to reach the valve (a) of the second threaded hollow fastener 6. The test gas supply will be stopped when pressure value shown on the pressure gauge 82 reaches a desired value. About 24 to 48 hours after the test gas is stopped, the employee may inspect the pressure value of the pressure gauge 82. It means there is no leak in the automobile air conditioning system if there is no drop of the pressure value of the pressure gauge 82. To the contrary, it means there are leaks in the pipes of the automobile air conditioning system if there is a significant drop of the pressure value of the pressure gauge 82.

The mounting of the second threaded hollow fastener 6 through the slot 5 is adjustable. That is, the second threaded hollow fastener 6 may move sidewise in the slot 5. This enables an employee to apply the first and second fasteners 3, 6 to a wide variety of expansive valves, which may be made by different automobile component manufacturing companies.

While the invention has been described in terms of preferred embodiments, those skilled in the art will recognize that the invention can be practiced with modifications within the spirit and scope of the appended claims.

What is claimed is:

1. A connection device for a leak detector comprising:
   an elongated body defining a plurality of fixing holes, a through hole, and a slot;
   a first threaded hollow fastener disposed through the through hole of the elongated body, the first threaded hollow fastener including a first end and a second end, the first end of the first fastener having a first externally threaded valve, the second end of the first fastener having a first connection member defining an opening to the hollow of the first fastener, and a first O-ring placed on the first connection member; and
   a second threaded hollow fastener moveably disposed through the slot of the elongated body and including a first end and a second end, the first end of the second fastener having a second externally threaded valve, the second end of the second fastener having a second connection member defining an opening to the hollow of the second fastener, and a second O-ring placed on the second connection member.

* * * * *